L. PRATT.
Seed-Planter.
No. 3,562.
Patented Apr. 25, 1844.
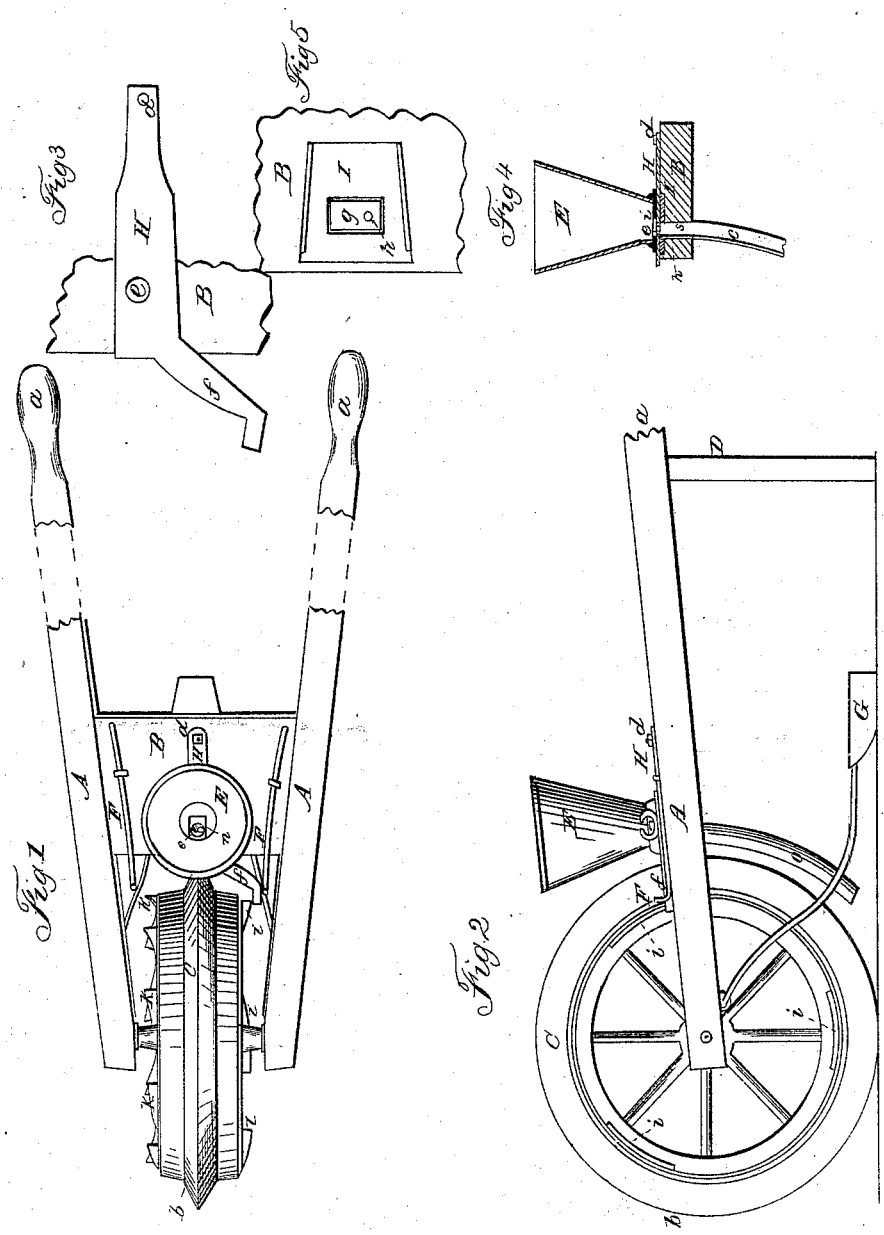

UNITED STATES PATENT OFFICE.

LOEA PRATT, OF AMHERST, NEW HAMPSHIRE.

IMPROVEMENT IN SEED-PLANTERS.

Specification forming part of Letters Patent No. 3,562, dated April 25, 1844.

*To all whom it may concern:*

Be it known that I, LOEA PRATT, of Amherst, in the county of Hillsborough and State of New Hampshire, have invented a new and useful Improvement in Seed Drills or Planters; and I do hereby declare that the following description and accompanying drawings, taken in connection, constitute a full and exact specification of the construction and operation of my invention.

Figure 1 of the drawings above mentioned represents a top view of my improved seed drill or planter. Fig. 2 is a side elevation thereof.

The frame or body of the machine consists of two bars, A A, which diverge from each other, as represented in Fig. 1, are connected together by a board, B, upon which the dropping apparatus is arranged, and terminate at two of their opposite ends in handles *a a*. To the other ends the wheel C is applied, like the wheel of a common wheelbarrow, and the frame is sustained in its requisite position by a leg, D, inserted in the under side of each of the bars, so as to rest on the ground, as seen in Fig. 2.

The hopper E for receiving the seed is placed and secured upon the top of the board B.

The periphery of the wheel C is formed triangular, or has a triangular rim, *b*, extending around it, the said rim being elevated above the outer circumference of the wheel, and formed in its cross-section of a triangular shape, so that when the wheel is rolled over the surface of the ground the triangular rim will sink therein and form a furrow or groove, within which the seed is dropped from a conductor, *c*, extending downward from the hopper. A double-winged covering apparatus, G, of the usual kind, is placed immediately or sufficiently in rear of the conductor to scrape the earth on the sides of the furrow into the same, and thus cover the seed as soon as it is planted.

The seed-dropper H consists of a long and flat piece or plate of metal of the shape represented in Fig. 3, wherein it is denoted as detached from the machine. It is arranged directly beneath the hopper and lies upon the top surface of the board B. It vibrates laterally upon a fulcrum at one end, as seen at *d*, has an aperture, *e*, formed vertically through the part of it within or just beneath the hopper, and a bent arm, *f*, extending from its other end and placed in contact with one of the sides or edges of the wheel C, the said arm being pressed against the same by a spring, F or F', Fig. 1, as the case may be. The seed-dropper rests and moves upon a plate of metal, I, (see Fig. 4, which is a vertical section of the hopper and parts beneath it,) which is sunk within and secured to the board B, the said plate I having a sunken space formed in its top surface to receive a thin metallic gage-plate, *g*. (See Fig. 5, which denotes the plate I and plate *g*.) The plate *g* has a small hole, *h*, formed through it of the size required to permit such a quantity of seed to be dropped through it at each vibration of the seed-dropper as may be necessary. A series of these plates, each having a hole differing in size or diameter from the others, may accompany each machine, so that such a gage-plate may be employed as will adapt the apparatus to planting seeds of any particular kind or size. The hole *e* through the seed-hopper passes beyond or by the hole *h* in the gage-plate whenever the seed-dropper is moved toward the center of the machine; but when it departs therefrom the hole is brought directly over the aperture, so as to drop the seed that may be in the aperture of the seed-dropper into and through the hole *h* and conductor, by which it is conveyed to the furrow.

The seed-dropper is pressed outward laterally by a series of cams, *i i*, &c., formed on one edge of the rim of the wheel C, and inward by the spring F. Another series, *k k k k*, &c., is arranged upon the opposite edge of the rim, there being in this latter series double the number of cams that there is in the first series, or a greater or less number, according to circumstances. Therefore, in order to make the seed-dropper vibrate twice as fast, or faster than it does when in the position seen in Fig. 1, it is only necessary to remove it or turn it over so that its arm shall rest in contact with the second series of cams.

Having thus described my invention, I shall claim—

1. The triangular projection or rim *b*, applied to the periphery of the wheel for the purpose of opening the furrow and thereby dispensing with a furrow-plow such as is generally used in drilling-machines.

2. Arranging upon the side of the wheel opposite to that on which the first series of cams is placed, and in combination therewith, a second series the cams of which are placed at greater or less distances apart from each other than those of the first series, the same being for the purpose of increasing or diminishing the vibrations of the seed-dropper, so as to readily adapt the machine to drill or sow in hills, the whole of the above being arranged and operating substantially as above specified.

In testimony that the foregoing is a true description of my said invention and improvements I have hereto set my signature this 7th day of March, 1844.

LOEA PRATT.

Witnesses:
R. H. EDDY,
DAVID A. GRANGER.